United States Patent [19]

Kürner

[11] Patent Number: 5,603,744
[45] Date of Patent: Feb. 18, 1997

[54] PROCESS FOR ESTABLISHING OPTIMUM SOIL CONDITIONS BY NATURALLY FORMING TILTH

[76] Inventor: Rudolf Kürner, Hessigheimer Strasse 22, D-70437 Stuttgart, Germany

[21] Appl. No.: 211,801

[22] PCT Filed: Oct. 13, 1992

[86] PCT No.: PCT/EP92/02356

§ 371 Date: Nov. 15, 1994

§ 102(e) Date: Nov. 15, 1994

[87] PCT Pub. No.: WO93/08143

PCT Pub. Date: Apr. 29, 1993

[30] Foreign Application Priority Data

Oct. 14, 1991 [DE] Germany .......................... 41 33 984.3

[51] Int. Cl.$^6$ .................... C05F 3/00; C05F 5/00; C05F 9/04; C05F 11/02
[52] U.S. Cl. .................... 71/9; 71/13; 71/15; 71/23; 71/24; 71/25; 71/62; 71/63
[58] Field of Search .................... 71/1, 8, 9, 10, 71/13, 15, 23–25, 62, 63

[56] References Cited

U.S. PATENT DOCUMENTS 3,944,408 3/1976 Postrihac .................... 71/13
4,559,073 12/1985 Minato et al. .................... 71/15

FOREIGN PATENT DOCUMENTS

| 419899 | 2/1937 | Belgium . |
| 0221219A1 | 4/1987 | European Pat. Off. . |
| 0444392A3 | 9/1991 | European Pat. Off. . |
| 2023318 | 8/1970 | France . |
| 283369 | 10/1990 | Germany . |

*Primary Examiner*—Ferris Lander
*Attorney, Agent, or Firm*—Bardehle, Pagenberg, Dost, Altenburg, Frohwitter, Geissler and Partners

[57] ABSTRACT

A process is disclosed for establishing optimum soil conditions by biologically disintegrating minerals in the presence of Ca compunds, clay and protein- and lignocellulose-containing organic vegetable waste, as well as protein-containing organic animal waste. The process includes the following steps: a) finely crushing a mixture of minerals containing at least potassium, magnesium, phosphate and silicate, all in insoluble form; b) subjecting the vegetable and animal organic waste to an usual preliminary crushing step; c) micronizing the organic waste, preferably while homogeneously mixing it with the mixture of minerals; and d) fermenting the mixture of micronized organic waste and finely crushed minerals in the presence of finely crushed Ca-compound and clay, in microbially appropriate conditions.

17 Claims, No Drawings

PROCESS FOR ESTABLISHING OPTIMUM SOIL CONDITIONS BY NATURALLY FORMING TILTH

The invention relates to a process for the formation of a whole-nutrient fertilizer through the biological disintegration of minerals in the presence of Ca compounds, clay and plant and animal organic wastes. Furthermore, the invention relates to the making-available of a whole-nutrient fertilizer (mineral humus) according to said process.

One of the fundamental problems facing agriculture today consists in the increasing impoverishment of agriculturally used soils with respect to biological activity. Such impoverishment is easily discernible from the small number of earthworms and simultaneously signifies the inadequate supply of minerals by the soil for plant nutrition and insufficient crumbliness of the soil.

So-called "good tilth" is the expression typically used to describe an agriculturally useful soil with biological activity, that is, a healthy and fertile soil. A soil of good tilth is taken to mean a crumbly, well aerated soil that produces no clods when ploughed. The essential characteristic of a soil of good tilth, therefore, is its crumbliness. This does not mean, however, that a soil that has been rendered crumbly by ploughing or by other mechanical means is necessarily of good tilth. Rather, for a soil to be of good tilth, the topsoil must remain crumbly throughout the entire growing season and must not collapse under the muddying effect of water.

Such good tilth of the soil is neither maintained nor restored by the present-day methods and fertilizers/soil-improving agents used in agriculture. That is, even the intensive treatment of soils with commercial fertilizers (e.g. ammonium nitrate, urea, potash fertilizer, Rhenania phosphate, basic slag) and/or farmyard fertilizers (e.g. liquid manure, dung, wood ashes, bone meal, compost) is insufficiently able, or indeed unable, to counteract the loss of good tilth. Moreover, soils are in some cases overfertilized by farmers who fail to realize that the soil is frequently lacking in just one or more specific constituent(s), with the result that those components additionally contained in the fertilizer are worthless to the soil and accumulate in surface waters and groundwaters, playing a major part in the eutrophication thereof.

In spite of normal methods of fertilizing and soil-working, it is possible to discern increasing soil exhaustion in the form of slowly and steadily declining yields, with causal significance accruing to the depletion of trace elements in the soil, the mostly one-sided removal of nutrients and the accumulation of water-soluble, plant-growth-inhibiting substances, in addition to the loss of good tilth.

That part of the soil essential to plant nutrition is the so-called mineral humus, with its content of humic acids being all that this actual humus has in common with the substance generally known as humus. For this reason, a distinction is made in the following between so-called humus ("humus") and the true humus (mineral humus) according to the invention.

This misconception among experts with regard to humus has meant, therefore, that the method of fertilizing currently thought to be the ideal involves a combination of organic and mineral fertilizers, which, after being applied into/onto the soil, are supposed to be converted jointly into mineral humus by microbes. This, however, takes place only to an inadequate extent, which is manifested in an insufficient and constantly decreasing mineral-humus content in the soil. Nor does the method of fertilizing currently thought to be the ideal in any way augment or restore the crumbliness of the good-tilth soil.

DE-OS 36 14 183 has proposed calcium sulfate together with dolomite, soda, borax and citric acid as a fertilizer or rapid-action composting agent for organic wastes.

According to DE 37 44 317, in composting or wide-area fertilizing, the quality of the humus is substantially improved if calcium sulfate in combination with montmorillonite and basic slag and/or raw-phosphate powder is used for the fermentation of organic wastes.

Further processes for the production of soil improvers/soil additives/natural fertilizers have repeatedly been proposed. Such agents are described, for instance, in DE-OS 30 35 178 and DE 36 40 785. The former publication relates to a rock powder or a mineral composition containing Si, Al, Ca, Mg, Fe, Ti, K, Na, P as well as trace elements and rare earths. The agent described in the latter publication is a mixture of a rock powder and sawdust, chaff or ground bark.

The fertilizers described in DE-OS 20 45 648 and DE-OS 32 26 226 consist of a mixture of various oxides, e.g. $SiO_2$, $Fe_2O_3$, $Al_2O_3$, CaO, MgO, $K_2O$, $P_2O_5$.

A further agent is described in DE-OS 18 03 103 and DE-OS 19 29 195, which involves the fermentation of natural organic substances and/or coffee extracts additionally containing silicate-containing components and formates.

EP-A 221 219 describes a soil-improving agent obtained by the fermentation of a mixture of sewage sludge, a carbon carrier, calcium carbonate, a natural phosphate, gypsum and maize-starch meal.

Finally, EP-A 444 392 describes a process for the production of fertilizers or soil additives consisting of mineral and/or organic components, with it being possible to use as minerals various carbonates, which are required for buffering the acid pH value. Said agents contain neither phosphate, trace elements, gypsum nor clay.

A further, already mentioned measure to maintain or enhance the fertility of the soil consists in melioration (soil improvement) by means of so-called soil improvers. These influence the general structure of the soil, such as its crumbliness, water-absorbing capacity, gas-permeability and degree of aeration, without containing plant nutrients. By the broadest definition, soil improvers include, for example, alginates, pectins, silicates, mull and iron sulfates. Major significance accrues in this connection to artificial soil improvers (e.g. polyacrylonitrile, vinylacetate copolymers, polyvinyl propionate and butadiene-styrene copolymers). Soil-improving agents also include certain measures such as irrigation, crop rotation or erosion protection.

Essential to any life in the soil, i.e. to plant roots and soil organisms, is the "biotope", which is a system of hollow spaces consisting of differently sized pores. The coarse pores (>0.03 mm) serve principally for aeration and fast water distribution, whereas the medium-sized pores (0.003–0.03 mm) form the water-conducting system of the soil and are required for the storage of water. Finally, the fine pores (<0.003 mm) store the last water reserves in especially dry periods.

This structure of the biotope is also consistent with the needs of the differently sized soil organisms, whose coexistence is not always entirely peaceful. For instance, the bacteria in small spaces are safe from the hostile advances of larger organisms, such as the protozoa.

Likewise, the micro-region comprises appropriately populated anaerobic zones, while, in particular, the macro-region should be ideally aerated by atmospheric oxygen. Each rearrangement of the hollow spaces, therefore, results not only in a change in the air and water balance, but also in the sociological restructuring of its inhabitants.

Ideally, the coarse, medium-sized and fine pores coexist in the soil in approximately equal proportions in order to guarantee the optimum balance between aeration, water transport and water storage. The crumbly texture of the soil is made up of 1–3 mm crumbs, with the spaces between these crumbs representing the coarse pores, while the medium-sized and fine pores are in the crumbs themselves. It is easy to understand that the crumbs must be interlinked in order to allow capillary water migration from one crumb to the next. Such interlinking, however, cannot be achieved by mechanical crumb formation (e.g. by ploughing of the soil). Rather, this interlinking of the crumbs is effected from primary aggregates of 0.1–0.2 mm in size (mineral particles with clay-humus/clay-protein complexes as elastic cement) by soil organisms to form the 1–3 mm crumbs. This process is known as "organic stabilization" ("Lebendverbauung" in German), as also is the formation of the next-higher fixed link between the crumbs and the roots of the plants. The clay-humus/clay-protein double complexes, in turn, are formed by colloidal precipitations of humic acids/protein by means of $Ca^{2+}$ with the submicroscopic clay particles as an adduct.

Conventionally, it has always been assumed that the mineral humus must be created in the soil itself in order to improve the soil structure, i.e. the primary aggregates and their water-resistance. All attempts to provide agricultural soils with ready-made humus have failed to achieve the hoped-for success, since in no case, irrespective of further additions during its formation, has the "humus" migrated with its biological power ("biopower") into the soil structure; this biopower was not present, because the "humus" was not a mineral humus.

Likewise of decisive importance with regard to the crop yield from the soil is the latter's ability to bind the nitrogen supplied to it in the form of ammonium ions (e.g. from organic farmyard fertilizers such as liquid manure, semi-liquid manure or poultry droppings) and thus to make this nitrogen accessible to the plants for absorption. At present, however, this takes place only to a very limited extent owing to the volatility of ammonium salts. On the contrary, the majority of the nitrogen, present in the form of ammonium, enters the atmosphere in the form of ammonia and, according to latest findings, is one of the major factors in the death of the forests, at least in predominantly agricultural regions.

Apart from the problem of having to feed the earth's constantly growing population, life on earth is also threatened by the constantly increasing mountains of refuse and by the continually rising concentration of carbon dioxide in the earth's atmosphere. The increasing carbon-dioxide concentration is caused, among other things, by the ever deteriorating ratio between the number of humans and the quantity of vegetation, since only plant metabolism—in contrast to animal metabolism—is capable of forming organic matter from carbon dioxide and water. Refuse incineration, which is today frequently regarded in the industrialized countries as the answer to one problem (waste disposal), aggravates the other problem (constantly rising concentration of carbon dioxide in the earth's atmosphere, climate disaster) because of the fact that organic substances are unnecessarily oxidized and are emitted into the atmosphere in the form of carbon dioxide and water vapor.

As previously mentioned, agriculturally used soils often suffer from insufficient crumbliness and from a shortage of minerals. Since, however, the human organism, too, has a certain minimum requirement for a wide range of different minerals, yet humans constitute the last link in the food chain, these deficiencies in agriculturally used soils have, of necessity, a negative impact on the mineral balance in humans.

The same applies, of course, also to animal organisms. That is, only healthy animals, above all animals that have been sufficiently supplied with trace elements, represent—in the form of their meat, if the necessity arises—a source of high-grade, wholesome food for humans.

None of the agents/fertilizers described above in the prior art is capable of positively influencing the crumbliness of the soil along the above-described lines and at the same time of serving as a permanent provider of nutrients to the soil and thus to the plants. To be sure, conventional agents/fertilizers are able to supply the plant with a temporary dose of certain nutrients or minerals, but this positive effect is not of long duration, because, owing to their water-solubility, the nutrients are easily leached out, e.g. by rainwater. The human-induced or -promoted formation of (mineral) humus in the soil has so far been impossible to achieve.

Rather, with all conventional methods of composting and rotting-down crop residues or stable manures/farmyard fertilizers in the open fields, although organic substance has been broken down and converted by microbial action into carbon dioxide, nitrogen, nitrous oxide ($N_2O$) and water with the formation of humic acids (this has also been performed, at least in part, in the presence of buffering minerals), such methods of composting and rotting-down must be viewed as an aerobic counterpart to the prehistoric, anaerobic peat-generation process. The clay-humus/clay-protein double complex, i.e. the crumbly substance of good-tilth agricultural soils that accounts for fertility and plant health, is not, however, formed or promoted. Consequently, the conventional processes have resulted in the wasting of the biopower contained in the wastes, with the unnecessary formation of carbon dioxide and nitrous oxide ($N_2O$).

Consequently, the object of the present invention is to provide a process that, first of all, partially breaks down biomass and, by fermentation, builds up the thus formed humic acids and low-molecular proteins by way of complexes with clay and their aggregation with minerals to form 1–3 mm crumbs.

The object of the invention is achieved by the process according to claim 1. Firstly, lignocellulose-containing plant and, secondly, protein-containing animal waste or sewage sludge form primary aggregates in the presence of all essential minerals, trace elements, clay and Ca ions. The humic acids, dissolved colloidally in water, are first precipitated in a neutralizing and water-insoluble manner by Ca ions and then, through binding to the submicroscopically small clay particles, an elastic cement is formed for the likewise present mineral particles. This process takes place with all constituents in statu nascendi.

The thus formed primary aggregates, which are relatively bulky in comparison with the microbes and clay particles (sizes approximately 1 and 0.2 µm, respectively), can now be organically stabilized into aggregates of the 2nd order, the crumbs with a diameter of 1–3 mm, by means of colonies of organisms. The mineral particles are decomposed by the secretions of the microbes, this making them available both for the microbes and also for the plants. Only this simultaneous comprehensive supply of all the above-mentioned substances according to the process described in claim 1 under microbe-friendly general conditions in optimal spatial proximity (owing to the micronization) permits the nature-imitating formation of crumbly substance (mineral humus).

Microbe-friendly general conditions are to be construed as those that make available minerals, carbohydrates and proteins in homogeneous distribution and in sufficient quantity. Furthermore, the term "microbe-friendly general conditions" relates to the adequate presence of all substances essential to microbes and, finally, also to the physical parameters such as oxygen, water, temperature, prevention of unnecessary movement as well as to the opportunity for the microbes to fix themselves on a substrate.

An advantageous effect of the present invention consists in providing a process that allows the rapid conversion of wastes of many different kinds into a general-purpose agent (mineral humus, whole-nutrient fertilizer), said general-purpose agent improving the crumbliness of the good-tilth soil and permanently making nutrients and minerals available to the plants. Preferably, also, the formation of superfluous carbon dioxide is to be prevented in that the organic wastes from plants and animals are not oxidized to the stage of carbon dioxide and water vapor. Furthermore, the thus formed whole-nutrient fertilizer (mineral humus, general-purpose agent) results in a clear increase in plant growth and crop yield both quantitatively and also qualitatively if it is added in homogeneous distribution to the soil that is to be fertilized, in a quantity of 1–6%, preferably 2–5%, with reference to the weight of the soil to be fertilized.

Furthermore, the present invention makes available a general-purpose agent (mineral humus, whole-nutrient fertilizer) that not only increases the crumbliness of the good-tilth soil, but whose individual mineral components (ions) also remain stored in the soil and are not leached out by rain or irrigation water. Thus, the mineral components are available to the plants in only a small, but adequate, concentration, with this being continuously the case over a long period of time. The disadvantage of present-day conventional water-soluble fertilizers consists in the fact that, after they have been applied onto/into the soil, they briefly provide a much too high concentration of ions and therefore cause an osmotic shock to the microbes in the soil. On the other hand, the plants are simply unable to completely absorb the high concentrations of nutrients/trace elements, with the result that a large proportion of the nutrients from the applied fertilizer is leached out and contributes towards the eutrophication of bodies of water.

Moreover, the emission of ammonia into the atmosphere, caused by ammonium-rich farmyard fertilizers applied into/onto soils, is to be reduced and, at the same time, the ammonium is to be stored in the soil in a form in which it can be metabolized by plants.

The complexing of the ammonium is effected not only with the aforementioned calcium sulfate, but also by ion exchange on the likewise present clay, preferably bentonite/montmorillonite, vermiculite and illite. Other nitrogen-containing substances, such as proteins from organic farmyard fertilizers, are bound in the form of complexes/interstitial compounds, with the result that the fertilizing value of the nitrogen is fully maintained. Consequently, microbes and plants are able to absorb and utilize the nitrogen directly, e.g., in the form of an ammonium ion, without first breaking it down by microbial action into nitrate, with the result that there is no possibility of nitrates being accumulated in the plants.

All these objects of the invention are achieved by the process according to claim 1. Said process represents the simple decomposition of insoluble minerals, preferably waste minerals, through the fermentation of organic wastes/domestic refuse in the presence of clay and Ca compounds with simultaneous environmentally compatible disposal of the waste, with all components (i.e. organic waste, minerals, clay and gypsum) being present in homogeneous distribution. Thus, a considerable proportion of the refuse arising in the industrialized countries, which refuse is otherwise landfilled (e.g. gypsum) or incinerated (e.g. domestic refuse), can be disposed of in an environmentally sound manner, i.e., without any unnecessary increased generation of carbon dioxide, as well as in a beneficial manner, i.e., for the production of a soil-improving whole-nutrient fertilizer. Preference is given to simple and fast decomposition processes (rapid-action microbial decomposition), which, in order to ferment the mixture of organic waste and minerals (mineral mixture), make use of biomass, preferably microbiological biomass, such as sewage sludge.

The invention relates further to a whole-nutrient fertilizer material according to claim 14, said whole-nutrient fertilizer material being composed of plant and animal organic waste, a mineral mixture with/without trace elements as well as clay and at least one Ca compound.

The invention relates further to a mineral humus (whole-nutrient fertilizer) that can be obtained as the product of the process according to claim 1. Said mineral humus represents a general-purpose concentrate suitable for improving the soil, particularly its water-retention capacity and air-permeability, and also for promoting plant growth that is biologically intact and thus also extensively resistant to parasitic attack and mechanical influences. Said concentrate remains available to the soil and therefore to the plants and is not leached out, with the result that it is unable to contaminate any bodies of water. Rather, from the first day it is used, it produces an increased quality and also quantity of the crop yield in comparison with plants that have been conventionally considered to have been given an optimal application of fertilizer.

The concept of the fermentation of organic wastes should be understood here in its broadest sense and signifies the microbial degradation of plant, animal and other organic substances. It therefore includes, in particular, composting and humification, the degradation of organic domestic and industrial wastes, the wide-area treatment of soils used for agriculture and forestry as well as other processes for the degradation of organic wastes under the action of microorganisms.

In the process according to the present invention, it is preferred that insoluble minerals and/or rock powders and/or ashes and/or fly ash and filter dusts and/or trace-element additions are decomposed by micronized organic wastes to form mineral humus (whole-nutrient fertilizer).

It is essential for the whole-nutrient fertilizer (mineral humus) according to the invention to contain insoluble potassium and magnesium. Compared with hitherto used potash fertilizers, the whole-nutrient fertilizer according to the invention is of decisive advantage thanks to the insolubility of the salts of magnesium and potassium contained in it. The noxious nature of water-soluble potassium compounds in fertilizer becomes evident from the fact that cress seeds will not germinate on a grape marc or mycelium-humus fertilizer that has been supplemented with soluble potassium salt.

The mineral mixture according to the invention contains at least the following components: at least one insoluble potassium mineral, preferably a potassium silicate, particularly potassium feldspar ($K[AlSi_3O_8]$), at least one insoluble Mg mineral, a Ca compound, preferably calcium sulfate, a clay, preferably bentonite/montmorillonite, silicate(s) (e.g. ashes and dusts from lignite-fired power stations, lava powder, lime/diatoms or pulverized glass), insoluble phosphate(s), preferably basic slag. Preferably, trace elements such as Fe, Co, Cu, Mn, Mo, V, W, Ti, Ni, Zn, Se, F, Br, I, As, Sn, Ge, S, Al are added to the mineral mixture.

A preferred calcium compound is calcium sulfate, this being attributable to various properties of calcium sulfate. The most important advantage of gypsum as compared with other Ca compounds is based on its excellent ability to complex readily volatile ammonium (which accounts for approximately 50 to 70% of the total nitrogen content of liquid manure, semi-liquid manure etc. and which is formed enzymatically from the urea discharged with the urine), to prevent evaporation of the ammonium vapors into the atmosphere and to increase the metabolization of nitrogen to a hitherto unattained efficiency. Preferred as additional calcium-containing material(s) is/are paper sludge and/or sugar lime from paper mills and sugar factories, respectively, which contain calcium in the form of calcium carbonate.

The use of bentonite/montmorillonite as clay is preferred in order to permit the formation of crumbly substance in the soil (clay-humus/clay-protein complex). This is because the formation of humic acids (as a product of the degradation of organic substances) signifies the formation of acid COOH groups. These COOH groups are neutralized by mineral bases (alkali ions, alkaline-earth ions) and are thus better protected from further oxidation than the free acids. Neutralization leads logically also to a buffer effect, which is further augmented because of the high ion-exchange capacity of bentonite, with the result that it is possible to obtain or improve ionic and pH conditions that are favorable to life in the soil.

Silicates as an addition to the mineral mixture fulfil the function, as a result of relatively aggressive secretions (citric acid, hydrochloric acid, hydrofluoric acid) from microbes and fine roots, of going into solution in the form of inorganic silicic acid(s) and thus of reinforcing the supporting tissue, particularly in the nodes of stalks, twigs, branches and trunks, and of increasing the resistance of plants to damage by insects. Furthermore, they act as so-called soil improvers.

If, however, the silicic acid(s) enter(s) a microbial passage, biomethylation of the silicic acid(s) occurs, which, in organic form, demonstrably act as a catalyst in the synthesis of (organic) protein from inorganic nitrogen salts.

The process according to the invention for the formation of crumbly substance in agricultural soils of good tilth through the biological disintegration of minerals according to claim 1 is described in greater detail in the following.

The organic waste is classified and is then pre-crushed in a coarse grinder. The next stage in the fully automated process is the separation of metals by means of a magnet for ferrous metals and by means of an eddy-current magnet for non-ferrous metals, whereupon the waste mixture, now containing only organic substances, is fed into a fine grinder, where, with the homogeneous admixture of a pre-pulverized mineral mixture by means of a paddle mixer, it is micronized/defibrated and converted into a water-rich solid culture medium. Alternatively, it is also possible to employ screw-type grinders for the micronization of the organic waste.

Whereas, for conventional composting, organic waste has hitherto been crushed to an average particle size of 2–5 cm, "micronization" according to the invention signifies the pulverization of the organic wastes to sizes below 1 mm, preferably below 0.1 mm, particularly 0.01–0.1 mm. Such pulverization is sufficient to destroy cell structures and to release cell contents.

Organic waste capable of being used for the process according to claim 1 should be understood as organic substances of all kinds, particularly paper, leather, domestic refuse, textiles, animal and plant kitchen waste, organic waste from horticulture, agriculture and forestry, kelp, sewage sludge and faeces. Particular preference is given to the use of a mixture of sewage sludge and unclassified domestic refuse (merely metals having been removed beforehand), with the weight ratios being 1–10:1–10, preferably 1–5:2–10. Particular preference is given to a ratio (with reference to the weight) of 1:2–8, especially 1:3–6. This results in the optimization not only of fermentation, but also of the reuse of the arising residential wastes constituted by domestic refuse and sewage sludge.

The mineral mixture used according to the invention contains at least the following components: a) Potassium in insoluble form (particularly potassium feldspar), b) Silicate(s), c) Insoluble phosphate(s) and d) Magnesium in insoluble form and, if required, e) Trace elements. Preference is given to mixtures containing one or more elements from the group consisting of Fe, Co, Cu, Mn, Mo, V, W, Ti, Ni, Zn, Se, S, Al, F, Br, I, As, Sn and Ge. The components of the mineral mixture are used, with reference to the weight, in the ratio 1–10:1–10:1–10:1–10 (a:b:c:d), preferably in the ratio 1:1:1:0.5 (a:b:c:d). The proportion of trace elements amounts, with reference to 1–10 parts by weight of each of constituents a), b), c) and d), to 0.01–1, preferably 0.1–1, parts by weight.

Before being fed into the fine grinder, the mineral mixture is pulverized, i.e. reduced to an average particle size of less than 0.1 mm, preferably to a size of 10–50 μm. The same applies to the Ca compound insofar as the latter does not undergo quasi-micronization as a result of its low solubility. Being a submicroscopic mineral with a primary-particle size of only approximately 0.2 μm, clay is already pulverized and merely needs to be disagglomerated with the use of moisture.

This preferably homogeneous mixture of pulverized minerals, pulverized or low-solubility Ca compound, micronized organic waste (plant and s animal) as well as clay is referred to as so-called whole-nutrient fertilizer material. Said material is introduced into a fermenter, where it is fermented. The small particle size of all constituents guarantees the optimally homogeneous thorough mixing of the whole-nutrient fertilizer material and thus its optimal fermentation, which allows the formation of the so-called primary aggregates in statu nascendi. These primary aggregates are, as described above, converted by microbes into 1–3 mm crumbs, the so-called aggregates of the 2nd order.

The individual components are present, with reference to the weight, in ratio A, preferably in ratio B, particularly in ratio C (mineral mixture:organic waste:clay:Ca compound). The ratio of the individual constituents of the mineral mixture is, with reference to the weight, 1–10:1–10:1–10:1–10, preferably 1:1:1:0.5 (in the order given as a)–d) on page 12).

A 4–40:30–1500:1–10:1–10
B 5–30:50–1000:1–8:1–8
C 10–20:100–500:1–5:1–5

The whole-nutrient fertilizer material is fermented under microbe-friendly general conditions following the homogeneous mixing of the individual components. Preferably, fermentation is carried out within 24 to 48 hours in a sporadically rotating drum with forced gassing and optimization of the relative humidity (rH/rF)/water activity ($a_w$).

Unusual and uncommon in the field of waste technology, the micronization of the individual components of the organic waste leads, with an enormous increase in surface area, to the destruction of cell structures and thus to the release of cell contents, e.g. enzymes, thus also preventing the formation of leachate as a result of an improved liquid-absorption capacity.

Owing to their enlarged surface area/area for attack, the cell contents released in the pulverization of the organic waste are particularly well accessible to microbes and oxygen and commence immediately, under reversal of the biochemical equilibrium reactions, with the degradation of organic substance. This biotic degradation is additionally reinforced by spontaneous abiotic autoxidation, with, for example, iron, copper and vanadium ions having a catalytic effect. The presence of blood has a particularly catalytic action because of the optimally effective, iron-and copper-containing respiratory enzymes.

The carboxyl groups created in the course of the reactions of degradation are neutralized by the mineral bases present, are buffered and thus protected from further oxidation. The aim of the conversion process, namely, is not the complete, principally abiotic oxidation of the organic mass until it is completely mineralized into carbon dioxide, which would then escape into the atmosphere, but, following partial primary degradation, the formation of protein (microbes) as well as of carbohydrate-microbe slime by biotic metabolic processes. Said slime is desired because carbohydrate-microbe slime contains partially oxidized and/or side-chain-methylated cellulose from the bio- or leaf mass, which has an extremely high water- and heavy-metal-binding capacity, with it being possible for the water-binding capacity to be up to 1000 times its own weight. Microbe slimes hold the primary aggregates together in the soil and thus form the so-called topsoil (crumbs 1–3 mm in size). Moreover, the slime layer of the microbes is rich in enzymes, which are capable of degrading organic substances. The resulting products of degradation can then be metabolized by the microbes.

This is the stage of the process in which the resulting carboxyl groups are buffered by the mineral bases, with the result that neutral pH values, usually preferred by microbes, are obtained. Consequently, a neutral pH value influences the rate of microbial conversion.

The fermentation reaction commences immediately when the aforementioned components—pulverized mineral mixture, micronized plant and animal organic waste, clay and Ca compound, particularly Ca sulfate—are brought together under aerobic conditions. Adequate ventilation is preferred in order to prevent the formation of root-damaging substances that arise during the anaerobic rotting of biomass, since such substances can no longer be removed even by subsequent conventional composting. The oxygen demand of the individual microbes may vary greatly. For this reason, the oxygen concentration should be 20 to 40 vol. %, preferably approximately 35 vol. %, depending on the types of microbe, with this being accomplished by the supply of oxygen during fermentation. Given sufficient critical mass, temperatures of over 55° C. are quickly obtained in the fermenter. Pathogenic germs (e.g. cholera, tetanus, *E. coli*) are irreversibly killed off both because of the temperature and predominantly also by antibiotics produced, for example, by streptomyces (streptomycin). The non-pathogenic germs are not killed off, but rather become encapsulated in the resting spore form when they lose their conditions of existence owing to lack of food, moisture and too high/low temperature.

The maximum temperatures of 82° C. achieved during the above-described fermentation process (microbiological mineral decomposition) guarantee the inactivation of undesired plant seeds that may possibly be present.

The optimum fermentation process is obtained by setting the optimum carbon/nitrogen ratio. This ratio is (in the case of the initial mixture) approximately 1000:1–10:1, preferably approximately 100:1–10:1, particularly approximately 50:1–25:1. The C/N ratio is set by suitable mixing in the composition of the whole-nutrient fertilizer material. In a preferred embodiment of the invention, said ratio can advantageously be obtained by mixing sewage sludge with unclassified domestic refuse, with reference to the weight, in the ratio 1–10:1–10, preferably in the ratio 1–5:2–10, particularly in the ratio 1:2–8, particularly preferably 1:3–6.

In order to be active in aerobic fermentation, microbes, particularly bacteria, require a relatively high water activity (relative humidity) dependent on the type of microbe, said water activity not normally being very temperature-dependent. Consequently, it is necessary to set the optimum relative humidity (rH/rF)/water activity ($a_w$) in order to obtain successful microbiological rapid-action/mineral decomposition for formation of the crumbly substance according to claim 1. Said optimum relative humidity lies preferably in the range from 40 to 100%, particularly in the range from 50 to 95%.

After a maximum of a 48-hour "hot phase" with a precise zenith (i.e. temperature maximum, IR-spectroscopically proven end of microbial activity on the basis of optimal humic-acid formation), a mass, a crumbly substance of good-tilth agricultural soil (mineral humus, whole-nutrient fertilizer), is obtained, said mass (said mineral humus, said whole-nutrient fertilizer) combining all the preconditions for soil improvement and exceptionally enhanced, biologically intact growth together with simultaneously high resistance of the plants. Said mass is a whole-nutrient fertilizer (mineral humus), said whole-nutrient fertilizer (mineral humus) having the desired properties (as described on page 9).

According to a special embodiment of the invention, the fermentation process is in the form of a worm-composting process in which kitchen wastes (i.e. animal and plant waste) and animal dung are mixed with the optimal mineral-powder mixture. Of course, this process requires a suitably long time and large area compared with the above-described microbial rapid-action decomposition process.

According to a special embodiment, the invention relates further to "in situ" applications of the fermentation process. For example, the preferably homogeneous mixture of organic waste, clay, Ca compound and pulverized mineral mixture is applied directly into/onto the soil. It is essential in this regard that the soil should be covered, i.e. there s must be roots present. Fermentation then takes place through the microbes in the soil. Preferably, the superfine mineral/rock powders, clay and Ca compound are mixed into liquid-rich organic wastes, particularly liquid manure and/or semi-liquid manure and/or fruit pulps and/or sewage sludge (i.e. farmyard or natural fertilizer) and the wide-area application of said mixture is carried out immediately after the harvesting of the, for example, grain fields, preferably undersown with clover. Application directly after harvesting results in a high rate of biological conversion because of the still relatively high soil temperatures. The liquid-rich organic farmyard fertilizers (liquid manure, semi-liquid manure, etc.)—whose nitrogen content is mainly (at least 50 to approximately 70%) in the form of ammonium nitrogen, the majority of which, when applied over large areas using hitherto conventional techniques, escapes in the form of ammonia into the atmosphere (instead of entering the soil) and thus, according to latest findings, is a considerable factor in the death of the forests—are, according to the invention, advantageously reused in an environmentally sound manner, with their nitrogen content being supplied to the soil.

The simultaneously applied calcium sulfate, contained in the liquid-rich organic waste, ensures the complexing of the nitrogen and causes it to be stored in the ground in the form of (insoluble) deposits. Once having made contact, by means of their root systems, with these deposits of nitrogen, plants utilize the available ammonium nitrogen, because of the phytotoxicity of the ammonium ions, only from the contact surfaces and only in a manner appropriate to their growth and nitrogen demand.

Owing to its complexed ammonium nitrogen, the crumbly substance (mineral humus, whole-nutrient fertilizer) produced according to the invention ensures an ideal supply of nitrogen to the plants as a result of the phytotoxic regulation of ammonium-ion absorption by the plants themselves.

EXAMPLE 1

Organic waste consisting of 65 parts by weight of unclassified domestic refuse and 15 parts by weight of dewatered sewage sludge was micronized together with 1 part by weight each of bentonite, flue-gas-desulfurization gypsum, potassium feldspar, basic slag and magnesite as well as 1/10 part by weight of smelting wastes as a trace-element addition and was set to a water activity of 0.95.

Fermentation in a rotating drum of 20 cm³ capacity took place at oxygen concentrations of approx. 35 vol. % at steadily rising temperature as an equivalent to microbial activity up to the zenith at 82° C. after 24 hours and thus the end of the reaction with subsequent cooling.

The whole-nutrient fertilizer (crumbly substance, mineral humus) formed by fermentation was administered to various plants. Enormous increases in quality and quantity were obtained from both the plants and their fruits. Furthermore, the resistance of the plants to parasitic attack was strengthened to such an extent that it was possible for the damage (diseases) to be cured (for example, a very old, blight-infested apple tree had been in poor health for a number of years and bore only 3 to 4 apples per year; following an autumn treatment with the crumbly substance according to the invention, an unbelievable transformation occurred within the space of just a few months, said transformation being manifested, among other things, in hitherto unwitnessed blossoming in the following spring and in the disappearance of the blight infestation; furthermore, it was possible in the same year to harvest 250 kg of perfect apples).

EXAMPLE 2

In a 220-liter fermenter, (a) micronized garden and kitchen wastes (the structure of which was no longer recognizable) were mixed with (b) the contents of a cat litter box and dog excrement as well as 2 disposable diapers, with (c) clay powder, (d) gypsum and the further minerals consisting of (e) potassium feldspar, (f) power-station ash, (g) clarification-basin after precipitation and (h) dolomite as well as (i) kelp extract as a trace-element addition in the ratio 60:15:2:2:2:2:2:2:0.2 and were set to a moisture content of approx. 50 weight per cent and fermented. The reaction was completed after 48 hours at a peak temperature of 72° C.

The thus obtained mineral humus was administered to, among others, young outdoor tomato plants. Instead of, as before, growing 15 cm in 8 weeks, the plants now grew by 25 cm. The result was exceptionally thick stems and very many large leaves as well as fruits weighing between 250 and 400 grams with a diameter of 8–11 cm as opposed to 4–5 cm previously.

The tomatoes were perfect in appearance, had no internal cavities, were firm for cutting, had a hitherto unknown aromatic taste and were able to be stored for an exceptionally long period.

What is claimed is:

1. A process for producing the crumbly component, mineral humus, through the biological disintegration of minerals in the presence of Ca compounds, clay and protein- and lignocellulose-containing plant and protein-containing animal organic wastes, said process comprising the following steps:

(a) pulverizing a mineral mixture, comprising at least potassium, magnesium, phosphate and silicate, all in insoluble form;
    (b) pre-grinding the plant and animal organic wastes;
    (c) micronizing the organic waste, with homogeneous admixture of the mineral mixture; and
    (d) fermenting the mixture of micronized organic waste and pulverized mineral mixture under microbe-friendly conditions in the presence of a pulverized Ca compound and clay.

2. The process according to claim 1, wherein said mineral mixture comprises potassium, magnesium, phosphate and silicate with reference to the weight, in the ratio 1–10:1–10:1–10:1–10.

3. The process according to claim 1, wherein the mineral mixture further comprises at least one trace element selected from the group consisting of Fe, Co, Cu, Mn, Mo, V, W, Ti, Ni, Zn, Se, S, F, Br, I, As, Sn, Ge and Al, in a quantity of 0.01–1 parts by weight with reference to 1–10 parts by weight of each of the constituents potassium, magnesium, phosphate and silicate.

4. The process according to claim 2, wherein said mineral mixture comprises 1–10 parts by weight of potassium, magnesium, phosphate and silicate each, and said pulverized Ca compound and clay comprises 1–10 parts by weight of clay and/or 1–10 parts by weight of Ca compound.

5. The process according to claim 1, wherein said clay comprises at least one clay selected from the group consisting of a bentonite, a vermiculite and an illite and/or wherein said potassium comprises at least one potassium selected from the group consisting of potassium silicate and potassium feldspar, and/or wherein said Ca compound comprises at least one compound selected from the group consisting of calcium sulfate, and gypsum from flue-gas desulfurization plants.

6. The process according to claim 1, wherein said silicate comprises at least one of the group consisting of ashes, fly ashes, filter dusts from power stations, filter dust from lignite-fired power stations, filter dust from bituminous-coal-fired fluidized-bed power stations, diatoms, Nile sludge, lava powder, and primary-rock powder and/or wherein said phosphate comprises at least one of the group consisting of apatite, basic slag, and clarification-basin after precipitation.

7. The process according to claim 3, wherein said trace element further comprises at least one product of the group consisting of ores, drosses, smokes, dusts, slags, alloys, kelp and kelp extract.

8. The process according to claim 1, wherein said organic waste comprises at least one waste selected from the group consisting of domestic refuse, paper, leather, textiles, animal and plant kitchen wastes, wastes from horticulture, waste from agriculture, waste from forestry, kelp, sewage sludge, and faeces.

9. The process according to claim wherein said organic waste comprises sewage sludge and domestic refuse, with reference to the weight, in the ratio 1–10:1–10.

10. The process according to claim 1, wherein, with reference to the total weight of said mineral mixture, with/without trace elements and said Ca compound and clay, said organic waste comprises 5–200 parts by weight.

11. The process according to claim 1, further comprising applying, in homogeneous distribution into/onto the soil, said mixture of micronized organic waste and pulverized mineral mixture under microbe-friendly conditions in the presence of a pulverized Ca compound and clay in order to be fermented there by soil microbes, with the organic waste comprising at least one liquid-rich organic waste.

12. The process according to claim 1, wherein said micronizing and/or fermenting comprise adding an oxygen concentration of 20–40 vol. % in the gaseous phase, and/or wherein said fermenting is carried out under controlled relative humidity (rH/rF)/water activity ($a_w$), at a water activity of 40–100%.

13. The process according to claim 1, wherein, with reference to the total weight of all constituents, potassium and magnesium comprise a quantity of 0.05–1.0%, and calcium comprises a quantity of 0.1–3%.

14. A whole-nutrient fertilizer material, comprising: a pulverized mineral mixture comprising a fertilizing effective amount of potassium, magnesium, phosphate and silicate, all in insoluble form, a micronized protein- and lignocellulose-containing plant and protein-containing animal organic waste, a clay, and a pulverized Ca compound and wherein the mineral mixture, the organic waste, the clay and the Ca compound comprise, with reference to the weight, in the ratio 4–40:30–1500:1–10:1–10.

15. The whole-nutrient fertilizer material according to claim 14, wherein, with reference to the total weight of all constituents, potassium and magnesium comprise 0.05–1.0%, and calcium comprises 0.2–3%.

16. A whole-nutrient fertilizer (mineral humus), obtainable as the product of a process, said process comprising the following steps:

(a) pulverizing a mineral mixture, comprising at least potassium, magnesium, phosphate and silicate, all in insoluble form;

(b) pre-grinding the plant and animal organic wastes;

(c) micronizing the organic waste, with homogeneous admixture of the mineral mixture; and (d) fermenting the mixture of micronized organic waste and pulverized mineral mixture under microbe-friendly conditions in the presence of a pulverized Ca compound and clay.

17. The whole-nutrient fertilizer according to claim 16 for the treatment of soils and plants, with the whole-nutrient fertilizer being added to the soil in homogeneous distribution in a quantity of 1 to 6, with reference to the weight of the soil to be fertilized.

\* \* \* \* \*